Nov. 30, 1937.  W. O. PRAY  2,100,355
METHOD AND APPARATUS FOR UTILIZING MOLTEN MATERIAL IN HEAT TREATMENT
OF LIQUIDS NOT MISCIBLE WITH THE MOLTEN MATERIAL
Filed May 7, 1934   2 Sheets-Sheet 1

Patented Nov. 30, 1937

2,100,355

UNITED STATES PATENT OFFICE 2,100,355

METHOD AND APPARATUS FOR UTILIZING MOLTEN MATERIAL IN HEAT TREATMENT OF LIQUIDS NOT MISCIBLE WITH THE MOLTEN MATERIAL

William O. Pray, De Beque, Colo., assignor to Pray Research Corporation, De Beque, Colo., a corporation of Colorado Application May 7, 1934, Serial No. 724,430

17 Claims. (Cl. 196—92)

This invention relates to certain new and useful improvements in the method and apparatus for heat treating liquids, the main object being to provide a method which can be carried out in a small apparatus and yet have a high capacity whereby liquid can be heat treated very cheaply and the application of heat to the liquid can be controlled to a nicety, whereby liquids of all kinds can be heat treated.

This invention utilizes molten metals, or other molten materials, as a heat-carrying medium in the heat treatment of mineral oils and other hydrocarbons and the heating and evaporation of other liquids not miscible with the heating medium. More particularly, the invention relates to a method and means of accelerating the absorption of heat from within the body of a substantial pool of molten metal and transferring this heat to a shallow stream of liquid floating on its surface, simultaneously facilitating the vaporization of the heated liquid and accelerating the liberation of the vapors in the order of their generation. The invention is especially applicable in effecting the transfer of relatively small additions of heat, under close temperature control, to complete heat requirements in the heat treatment of mineral oils and other hydrocarbons, whether the operations are conducted under atmospheric, sub-atmospheric or superatmospheric pressure.

It has been proposed heretofore, to utilize molten metal as a heat-carrying medium by floating a body of oil on the surface of a pool of molten metal and causing the transfer of heat by direct conduction from the superficial surface of the molten pool to the body of oil supported thereon, heat being continuously supplied to the molten pool either through the walls of the enclosing chamber or by connecting the pool in circuit with a stream of similar molten metal flowing through a heater.

A heating system such as this, in which heat transfer is accomplished by direct conduction from the superficial surface of the molten metal, requires a volume of metal out of all proportion to the thermal work accomplished. The comparatively small heat transfer surface available limits the system to relatively small capacity and greatly restricts the thermal capacity of the molten metal.

In a horizontal cylindrical still, the area of the surface of the molten pool would be less than the product of the length of the still multiplied by its diameter, and in any vessel of practicable dimensions, this limited transfer surface would be the principal factor controlling the heating capacity of the system, irrespective of any excess capacity of the heating furnace or the area of the primary heating surfaces. Any attempt to increase heating capacity by extending the primary heating surface, for the input of heat to the molten metal, would be largely defeated unless equally extensive surfaces were provided for the transfer of this heat to the oil under treatment.

Heat cannot be put into the molten metal faster than it can be transferred by the secondary transfer surfaces without backing up heat in the system and creating a prohibitive temperature difference between the molten metal and the oil being treated. The volume of metal in the system may be capable of carrying larger quantities of heat, but in order to take full advantage of its thermal capacity and maintain a reasonably low temperature differential, it is necessary that the secondary heat transfer surfaces be equivalent to the primary heating surfaces.

The primary heating surfaces may easily be extended to any desired capacity, but where the secondary transfer surface is restricted to the superficial surface of the molten pool, it cannot be greatly extended without unduly increasing the dimensions of the apparatus. Practically the only advantage gained in utilizing molten metal in the manner described, is the more uniform control of temperatures and the functioning of the molten metal as a false bottom in the still to avoid direct contact of the oil with directly-fired heating surfaces and to prevent the formation of hard carbon deposits thereon.

In the present invention the importance of these facts is recognized, and one of the chief objects of the invention is to devise a method and means wherein heat transfer from the molten metal may be accelerated to such an extent that its thermal capacity can be fully utilized and thus reduce to a minimum the volume of metal required in the system, at the same time attaining high efficiency in the primary heater and an over-all heating and vaporizing capacity greatly in excess of known methods of utilizing molten material as a heat-carrying medium.

These and other important objects are accomplished by maintaining the molten metal in the form of a continuously flowing, elongated pool, connected in continuous circuit with a stream of similar molten metal flowing through a heater, the pool of molten metal being of such substantial volume that it may function as an accumulator for the continuous storage of large quantities of heat, from which a part of the heat may be continuously withdrawn and to which the heat so withdrawn may be continuously compensated by heat derived from the stream of hot metal flowing from the heater, the superheated metal being introduced at one extremity of the elongated molten pool, and partly cooled metal being withdrawn from the opposite extremity.

The transfer of heat to the oil being heated is accomplished by partly submerging a plurality of closely spaced, rotatable heat transfer elements directly in the body of metal forming the molten pool, and causing the extensive surfaces of these elements to absorb heat continuously from within the molten pool and transfer this heat directly into a shallow stream of oil floating on the surface thereof, and then causing the same surfaces to facilitate the vaporization of the oil and effect the rapid disengagement of the vapors by filming a part of the oil thereon and causing the filmed oil to be lifted into the free space of the distilling chamber and there, subjecting it to additional heat for vaporization, and simultaneously liberating the vapors as fast as formed, the additional heat being supplied directly from the surfaces of the heat transfer elements.

A further and important object of the invention is to effect the transfer of heat to the oil in small increments, under progressively rising temperatures and relatively moderate temperature differences between the oil and the heat-carrying medium. This may be accomplished as a result of the novel manner in which heat is progressively withdrawn from the molten pool by the heat transfer elements as it flows from end to end of the distilling chamber, whereby a gradually decreasing temperature gradient is established in one direction through the molten pool, and a gradually increasing gradient in the opposite direction. By causing the oil to flow countercurrent to the flow of the molten pool, toward the zone of maximum temperature, it receives successive additions of heat from the heat transfer elements at successively higher temperatures until it reaches the zone of maximum temperature and the heating operation is completed.

Other and further objects and advantages of the invention will be hereinafter set forth and the novel features thereof defined by the appended claims.

Figure 1:
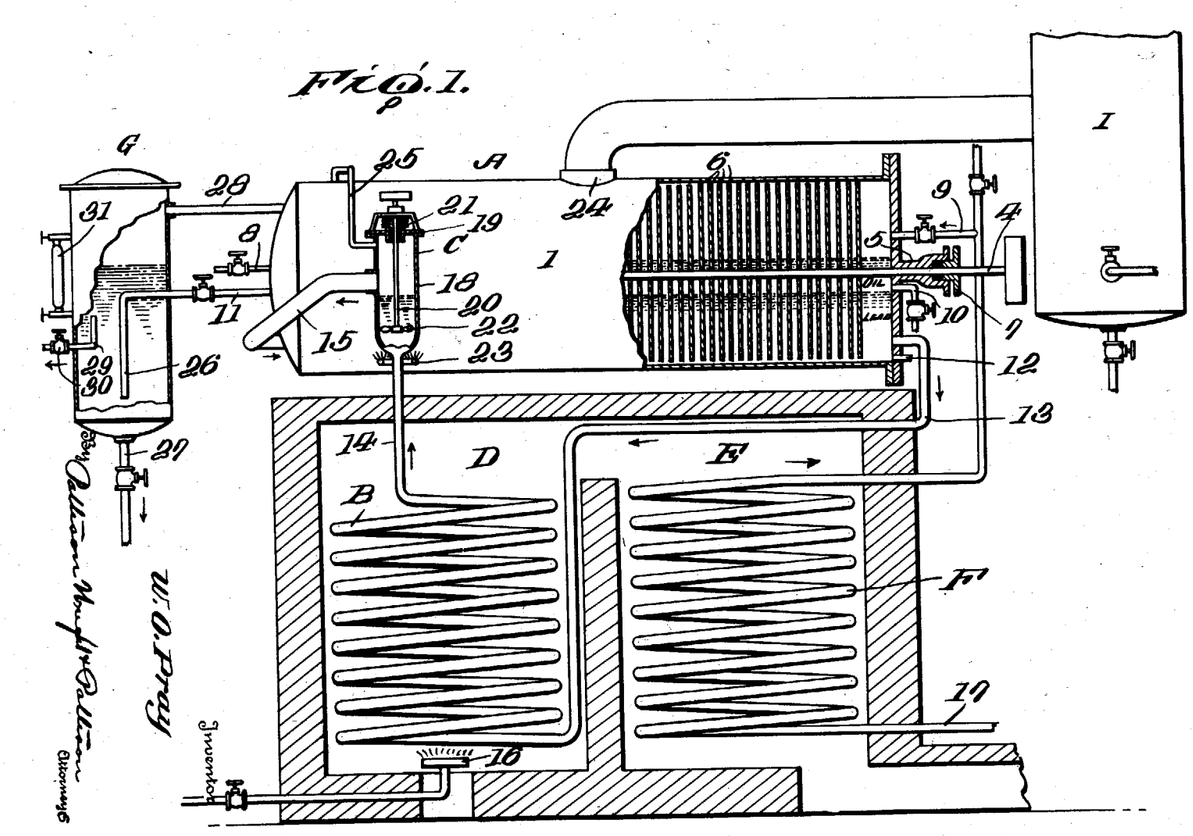
Figure 1 is a longitudinal section, partly in elevation, showing diagrammatically one form of an apparatus for carrying out my improved method of heat treating liquids.
Figure 2:
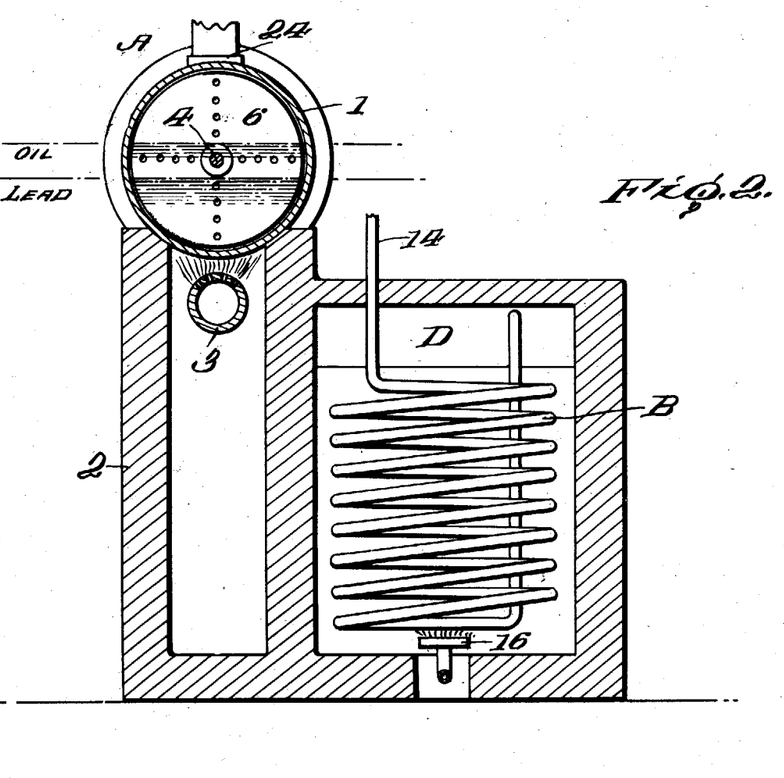
Figure 2 is a vertical transverse section through Figure 1.

In the drawings I have shown one form of apparatus for carrying out my improved method of utilizing molten material in the heat treatment of liquids not miscible with the molten material in which a still is generally indicated by the reference character A comprising a horizontal cylinder 1, mounted on a suitable furnace 2, heated by burner 3. The still is set high enough to bring the bottom of cylinder 1 above the top of the heating coil B. A shaft 4, centrally mounted in still A, revolves in suitable bearings 5, set in opposite heads of the still. Rigidly attached to shaft 4 is a series of closely spaced foraminated metallic discs 6 of slightly less diameter than the interior of cylinder 1 and having sufficient clearance to revolve freely therein. The discs 6 may consist of sheet steel or other suitable metal or alloy, and may have circular or slotted perforations to permit of the forward motion of the molten metal and oil through the still. The number of perforations in each disc, and the size thereof, will depend on the rate with which the molten metal and oil are advanced through the still. The total area of the openings should be large enough to permit the molten metal and oil to advance through the still freely. The openings may be arranged so that in alternate discs they will have a staggered relation. Discs of conical, dished or corrugated form are known, but the flat faced, perforated discs are the most simple, and are satisfactory for the purposes of the invention. One end of shaft 4 extends through the head of still A in packing gland 7, and may be driven by any suitable mechanism providing for changes in speed during operation, and for reversing the direction of rotation when desired. Ordinarily, the discs will be rotated in one continuous direction, but may, periodically, be reversed and given an oscillatory motion if desired.

Obviously, the disc assembly may be driven by other means, such as a set of gears mounted in the interior of the still, the driving gear being mounted on a shaft extending through one head of the still into the free space of the chamber. No part of the gears should extend into the molten metal.

Duplicate oil inlets and outlets may be provided in the heads of still A to allow oil to enter or leave the still at either end, thus permitting either concurrent or countercurrent flow of the oil to the flow of the molten pool. Fresh oil may enter still A through valved pipes 8 or 9 and residual oil may be withdrawn through valved pipes 10 or 11. An opening 12 provides an outlet for draining the contents of the still. Pipe 13 connects the still with heating coil B at its inlet. Pipe 14 connects the outlet of heating coil B with the bottom of pump C. Pipe 15 connects still A with the outlet of pump C for the return of reheated molten metal to the still. Heating coil B is mounted in furnace D, heated by burner 16. Pipe coil F, mounted in the economizer section E of furnace D, is heated by the furnace gases from furnace D to preheat the oil being charged to still A. A pump (not shown) may be used to force the oil through coil F, being connected thereto by pipe 17.

I preferably employ lead which can be readily heated into a molten state, but I wish it to be clearly understood that I do not wish to limit myself to the use of any particular kind of material so long as the material is capable of being heated into a molten state.

Heating coil B is shown as a simple helical pipe coil mounted vertically in furnace D. When the apparatus is in operation, a continuous stream of molten metal circulates through the coil, being withdrawn from one end of the molten pool in still A through pipe 13 and returned to the opposite end of the pool through pump C and pipe 15. Obviously, other types of coils and furnaces may be used for the purpose, but as no oil can enter coil B, carbon troubles are absent. Consequently, there is no necessity of employing the elaborate tubular heaters found necessary when oil is exposed directly to the heated walls of the tubing. I have found through extended experiments in the use of molten metals, that the elimination of joints in coils and piping should be carried as far as possible. Therefore, simplicity in the design of coils, piping, pumps and connections is employed.

Pipe coil F is shown, for the purpose of illustration, as a simple helical coil mounted vertically in economizer section E of furnace D. However, as this coil is heated by convection with waste heat from furnace D, it may be of any type commonly used for preheating oils. Prior to its introduction into coil F, the oil may be passed through heat exchange apparatus (not shown) common to the art, but as such means of heat exchange constitutes no part of the present invention, no description is necessary.

Pump C consists of a cylindrical chamber 18 closed at the top by a cover flange 19, in which is mounted a shaft 20 extending into the chamber through packing gland 21. A propeller 22 is rigidly attached to shaft 20 at its lower end. The shaft may be adjustable vertically, to raise or lower the position of the propeller as desired, also to lift the propeller clear of the molten metal into the free space of the chamber when it is desired to make repairs after the pump has cooled, without previously draining the molten metal. Shaft 20 may be driven by any suitable means in which provision is made for varying the speed of the propeller while in operation. An opening in the bottom of chamber 18 is connected with the outlet of coil B by pipe 14. A side opening is connected with still A by pipe 15. The free space in the pump chamber is in open connection with the free space in still A through pipe connection 25. A burner 23 is provided to heat the molten metal in chamber 18 when starting the system from cold. As shown for illustration, pump C is mounted near one end of still A. Obviously, however, it may be mounted in any convenient position between the outlet of the heating coil and connection with the distilling chamber.

The outlet to pipe 15, should preferably be slightly above the level of the molten metal in still A. The pump as shown, is designed for simplicity in operation and accessibility. Other types of circulating pumps might be substituted, but pumps having close fitting impellers or plungers or bearings subjected to the eroding action of fused metal are not to be recommended. Pump C is so designed that the propeller-shaft bearings are above the surface of the molten metal and easily accessible, and may be insulated from the heat of the molten metal if desired, and provided with suitable jackets for cooling by oil or other fluid. Unvaporized residue from still A flows through connections 10 or 11 to a combined trap and liquid level control chamber G. Stop valves on connections 10 and 11 permit oil to be withdrawn from either end of the still. One of the valves is open when the still is in operation, while the other is closed. Control of the liquid level of the oil stream in still A is accomplished in chamber G, which is in open communication with still A, so that the liquid level in the two chambers is always the same. Chamber G consists of a vertical cylinder connected with the draw-off lines from still A by pipe 26 which terminates near the bottom of chamber G in the pool of heavy residuum maintained therein. A valved draw-off line 27 permits the draining of heavy tars and sediment as desired. Pipe 28 provides open communication between the free spaces in still A and chamber G for pressure equalization. Draw-off line 29 with control valve 30 permits the continuous draw-off of residual from still A through chamber G. Valve 30 may advantageously be controlled automatically by a suitable liquid level control device of a type commonly known. A visual liquid level gage 31 assists in the control.

The still A is provided with a vapor outlet 24 leading to a condenser 1 and may be provided with a pressure control valve (not shown) for use when operating under superatmospheric pressure. Obviously, however, other well known means of controlling the pressure may be utilized. The vapor outlet may lead to fractionating and condensing apparatus known to the art. Provision also may be made for well known means of temperature and liquid flow control, as well as suitable piping, valves, pyrometers, pressure gages, liquid level gages and the like, all of which are commonly known. As none of these accessories form any part of the invention it is unnecessary to show or describe them.

When distilling heavy oils under subatmospheric pressure, vapor outlet 24 may be connected with well known apparatus for maintaining a continuous partial vacuum in still A. A suitable pump may be utilized for controlling the draw-off from chamber G, which may be automatically controlled by liquid level control devices.

In conducting the method with the apparatus shown, an example of the operation when distilling heavy oils under atmospheric pressure is given in the following description.

Still A, coil B and pump C and connections are first heated to the melting point of the metal by burners 3, 16, and 23. A separate melting pot, not shown, may be used to fuse the metal. The melting pot may be a tight chamber in which moderate air pressure may be used to displace the fused metal and force it through a transfer pipe to a temporary connection with pipe 15 through which it flows into still A from whence it finds its way into coil B. Sufficient metal is transferred to fill coil B and form a pool in still A to a depth of about four tenths its diameter, and at the same time filling pump C to a level corresponding with the level of metal in still A. The molten metal used is preferably lead or one of its alloys, preferably tin. The particular metal or alloy to be used will depend on the range of temperatures desired in the still and the object to be attained. Molten lead is satisfactory for a range of temperatures in the metal of from 700 to 1500 degrees F. When it is desired to operate at lower minimum temperatures, suitable alloys may be substituted, the melting points and compositions of which are commonly known. Obviously, the temperature of the metal must be maintained substantially above its melting point to avoid freezing of the metal through loss of heat to the oil.

In starting the apparatus from cold, after having been charged with the metal, the burner under still A is started first, in order to allow ample time for the fusion of the large volume of metal in the still. Owing to the relatively small area of the heating surface of the still-bottom, the mass of metal in the still requires a much longer time for its fusion than the metal in coil B. The metal in the coil will fuse quickly, and if the coil and still were mounted in the same furnace, it would be difficult to fuse the large mass in the still without overheating the coil. For this reason a separate furnace is provided to heat still A. After the still is brought to working temperature, practically all heat put into the system is generated in furnace D and conducted through the walls of coil B into the stream of molten metal circulating therein. The bottom of still A may then be fired only enough to prevent cooling by radiation. The metal in still A and pump C should reach fusion in advance of any fusion in coil B in order that the metal in the coil may expand freely into the still and pump chambers. When the heating of still A is sufficiently advanced, burner 23 may be started to fuse the metal in the pump and connections, after which burner 16 is started to heat coil B. While bringing coil B to working temperature, a slow stream of oil is kept in circulation in coil F, which may be by-passed around still A until the system is ready for operation.

When the metal in still A, coil B and pump C is sufficiently fluid, pump C is started, and circulation through the coil and still is established. The temperature in furnace D may then be rapidly increased until the system is brought to the desired working temperature. While this is being done, the discs 6 are slowly rotated in the pool of molten metal to heat them to working temperature and to radiate heat in the free space of the still. A shallow pool of heavy residual oil is maintained on the surface of the molten pool during this period, sufficient fresh oil being added to compensate for vaporization.

Pump C is mounted so that the outlet to pipe 15 is slightly above the level of the molten pool in still A. When the pump is idle, the levels of the molten metal in the still and pump correspond. With propeller 22 rotating at high speed, the column of metal in the pump chamber is elevated until it flows freely through pipe 15 into still A. Pipe 15 is larger in cross-section than the tubing in coil B to permit the free flow of the metal under a low head, and to allow for variations in volume when the speed of the pump is increased. Pipe 15 should be connected with still A at a point well below the surface of the molten pool to form a seal against the back flow of oil into the pump chamber when the pump is idle.

With pump C in operation, molten metal is withdrawn from one extremity of the molten pool in still A and returned to the opposite extremity after passing through coil B. The molten pool has a transverse area many times the area of the transverse section of the tubing in coil B, and therefore, moves through the still at relatively slow velocity compared with the velocity of the metal in the coil.

As the stream of hot metal enters still A from the heating coil, it meets the first of the series of discs 6, partly submerged in the molten pool, and is deflected thereby, becoming rapidly diffused through that part of the molten pool immediately adjacent thereto. As the metal slowly advances through the still, each successive disc absorbs a part of the heat stored therein, and the molten mass becomes progressively cooler as it flows toward the opposite extremity of the chamber, and each successive disc is of lower temperature than the preceding one. Conversely, the temperature gradient rises in the reverse direction, and the discs are of progressively higher temperature in that direction. The discs tend to baffle the flow of the molten pool and keep the metal constantly agitated, thus assisting in establishing the series of temperature zones longitudinally through the chamber.

In those operations where it is desired to subject the oil to a slow and progressive rise of temperature, it is caused to flow through the still countercurrent to the flow of the molten pool in the form of a shallow stream supported on the surface of the molten pool. The depth of the stream may be from one tenth to two tenths the diameter of the still chamber, and the liquid level is constantly maintained at a predetermined point. A regulated volume of preheated oil is continuously supplied to the stream through pipe 9, and a regulated volume of unvaporized residue is withdrawn through pipe 11 to liquid level control chamber G and thence through pipe 29 and control valve 30 to heat exchange apparatus, if desired, or otherwise disposed of.

As the oil stream advances through the still, it successively contacts the series of rotating discs 6 interposed in its course. The discs, heated substantially above the temperature of the floating oil, first enter the oil stream as they emerge from the molten pool and transfer a part of their heat thereto, and on emerging therefrom, a thin film of oil adheres to the emergent surfaces, and is carried into the free space of the still where it is subjected to additional heat to facilitate its vaporization, the added heat being supplied directly from the surfaces of the heated discs. As fast as formed, the vapors are liberated by the extensive disengaging surfaces of the discs, and are free to escape through ample vapor outlets to suitable fractionating and condensing apparatus, the particular apparatus depending on the nature of the oil being treated and the particular products desired. Any unvaporized oil remaining in the oil films is returned to the oil stream as the discs reenter the stream in the course of their rotation, and oil that is unvaporizable at the temperature prevailing in one zone, passes to a succeeding zone of higher temperature, and so on until the zone of maximum temperature is reached and the unvaporized residue is withdrawn from the still.

It is obvious that a wide range of thermal conditions may be maintained in the still by varying the temperature of the molten metal and the time of contact of the oil with the rotating discs, or the time of its passage through the still. A predetermined maximum temperature may be maintained in the molten pool, above which temperature no part of the oil can be heated. Close control of the temperature of the molten metal may be maintained by varying the temperature of the furnace and the velocity of the molten metal passing through the heating coil, which, in turn, controls the quantity of heat available in a given time in the molten pool. Further control may be exercised by varying the speed of the rotating discs and the volume of oil introduced to and withdrawn from the still; also by varying the temperature to which the oil is preheated before entering the still.

The essential features of my invention which differentiate it from the prior art are as follows:

The oil is heated while flowing in the form of a broad, shallow stream, constantly agitated by the transversely disposed, rotating discs, which, with the continuous filming of a part of the oil on the exposed surfaces of the discs, relieves the effects of surface tension and facilitates the mechanical liberation of the vapors.

The discs absorb heat from a plurality of zones within the molten pool and conduct it directly into the oil, giving up a part of the absorbed heat to the oil stream and then continuing to add heat to the extensive films of oil adhering to their emergent surfaces, thereby accelerating the transfer of heat for vaporization, and simultaneously facilitating the mechanical liberation of the vapors. The molten pool, as well as the floating oil and heat transfer elements, is in continuous motion, and the heating is accomplished without exposing any part of the oil to directly fired heating surfaces.

Further, the heating of the oil is accomplished in progressive steps, each successive disc contributing a small addition of heat both to the oil stream and oil film at a successively higher temperature. This is accomplished under a comparatively small heat differential between the heat-carrying medium and the oil being heated, while at the same time, a high rate of heat transfer may be continuously maintained under such conditions of control that no part of the oil need be subjected to unnecessary temperatures. The different fractions in the oil, being free to vaporize at any zone in the still, are progressively vaporized at their boiling points, and only those fractions remain in the oil stream, as it approaches the zone of maximum temperature, as are most resistant to the effects of heat and will not vaporize under the lower temperatures.

The large volume of metal in the molten pool provides an accumulator of substantial capacity for the continuous storage of heat, and the extensive submerged surfaces of the rotating discs provide means of quickly taking up this heat from all parts of the molten mass, and as quickly imparting it to the oil being heated. The transfer of heat from the molten pool is so uniform and gradual, and so greatly accelerated, that heat may be withdrawn from the accumulator as fast as supplied. Therefore, it is possible to utilize the heat-carrying capacity of the molten metal to a high degree, and to maintain a high rate of heat transfer while carrying a relatively low heat differential between the heating medium and the oil being heated. The result is that a comparatively small volume of molten metal in the system is sufficient for a large amount of thermal work, and there is an equivalent reduction in the size of apparatus required. The heat input to the system, per square foot of primary heating surface, is exceedingly high, compared with ordinary methods of heating oils, and high furnace temperatures may be maintained without fear of adverse results, because of the rapidity with which heat is withdrawn from the molten metal by the extensive surfaces of the rotating discs and the absence of carbon forming substances in the primary heating coil.

As an example of the exceedingly large heat absorbing and transfer surface it is possible to create in a still of comparatively small dimensions, assume the interior dimensions to be 37 inches in diameter by 12 feet in length. The disc assembly would consist of approximately 100 elements, spaced on 1¼ inch centers, each disc being three feet in diameter and having a total double surface area of approximately 14 square feet, a total of 1400 square feet of surface in the series of 100 discs. Assuming the discs to be submerged in the molten pool to four tenths their diameter, the submerged segmental area of the double faces of each disc would be approximately 5¼ square feet, or 525 square feet of heat absorbing surface constantly submerged in the molten pool. The remaining surface area, 875 square feet, would be above the surface of the molten pool, approximately 525 square feet of which would be available as heating and vaporizing surface in the free space of the still and upon which would be spread continuous films of oil in direct contact with the hot surfaces of the discs, the different fractions in the oil being free to vaporize as soon as the heat requirements are satisfied.

In contrast, it should be noted that in a still of the same dimensions and having a pool of molten metal of the same volume, if no auxiliary means of heat transfer were provided, the total area of heat transfer surface could not exceed 36 square feet, and the total evaporating surface, confined to the surface of the floating body of oil, could not exceed the area of the heat transfer surface. All heat transferred from the molten pool to the body of oil in contact therewith must be conducted from the superficial surface of the molten pool, and this could not exceed the area defined by the lateral dimensions of the still chamber. It is obvious that with such a limited surface for the transfer of heat, there is little accomplished by greatly extending the primary heating surfaces for the input of heat to the molten metal. On the other hand, if greatly extended auxiliary heat transfer surfaces are provided to accelerate the transfer of heat from the molten pool to the floating oil, the utilization of a heating coil with extensive primary heating surfaces is justified, and the thermal work accomplished with a given volume of molten metal can be so greatly increased as to make its use as an indirect heating medium entirely practicable.

If desired, the oil may be caused to flow in current with the flow of the molten pool by introducing it into the still through pipe 8, instead of 9, and withdrawing residual oil through pipe 10 instead of 11. In such an operation, the oil would be introduced into the zone of maximum temperature, where it would be subjected to sudden and rapid additions of heat, and would then flow toward the zone of minimum temperature and would leave the still at the predetermined minimum temperature. In most operations, however, it will be found preferable to flow the oil countercurrent to the flow of the molten pool and heat is under gradually rising temperatures.

The flexibility of the method will be obvious to anyone skilled in the art. With suitable modifications in accessory apparatus and the selection of a heat-carrying medium of the proper temperature range, the method may be broadly utilized in the heat treatment of mineral oils and other hydrocarbons, as well as other liquids which are not miscible with the heating medium.

Operations may be conducted under subatmospheric and superatmospheric pressures as well as under atmospheric pressure, without substantially changing the mode of operation or the apparatus.

The method is particularly applicable to the continuous distillation of lubricating oils and tarry residues under subatmospheric pressures as well as atmospheric pressure.

The ordinary resistance to the maintenance of a substantial partial vacuum, due to the surface tension in heavy oils and the effect of hydrostatic pressure when a column of oil of considerable depth is being heated, is relieved to a great extent, in the present method, as a result of the combined effects of maintaining the oil as a shallow flowing stream, while constantly agitating it at many points in its course, and continuously filming a part of it on the extensive surfaces of the rotating discs.

Vaporization occurs under exceedingly favorable conditions for the distillation of heavy oils, as a result of the gradual and progressive application of heat under low temperature differentials and the facility with which the vapors may be liberated without being subjected to unnecessary superheating, and when combined with the beneficial effects of lowered boiling points, through the maintenance of a partial vacuum, the method is particularly effective in protecting the heavy fractions of the oil against thermal decomposition.

Operation of the method under subatmospheric pressure may be conducted without substantially changing the mode of operation or the apparatus employed under atmospheric distillation. By selecting a suitable alloy, the melting point of the heating medium may be lowered to correspond with the reduction in the boiling point of the oil. The particular absolute pressure used will depend on the results desired. The means of mantaining the vacuum, as well as the auxiliary fractionating and condensing apparatus, are so well known as not to require description. As the free spaces in the distilling chamber, pump, and liquid level control chamber are all in open communication, the pressure in the entire system is equalized, and the circulation of the molten metal is not disturbed by the change in pressure. A suction pump (not shown) connected with the outlet of the draw-off pipe 29 of chamber G, is desirable to effect the continuous withdrawal of the residuum. The entire apparatus, of course, must be strengthened to withstand the pressure created by the vacuum. Ample vapor outlets should be provided so that the vapors, once formed, may quickly escape from the distilling chamber.

In a modified form of the invention, the molten metal in still A may be maintained as a stationary pool, and the separate heating and circulating system for the metal dispensed with, heat being supplied to the molten pool through the normal heating surface of the still, as exposed in the furnace chamber.

Such a modification, of course, reduces the capacity of the still and the thermal capacity of the molten metal, and eliminates the feature of progressive heating and vaporization, but the advantages gained through the use of the auxiliary heat transfer and vaporizing surfaces are retained, and a much greater heating capacity, per square foot of primary heating surface, is attainable than would be possible if only the superficial surface of the molten pool were available to conduct heat from the molten metal to the oil floating thereon.

In operation, the oil flows continuously through the still in the form of a shallow stream supported on the surface of the molten pool, fresh oil being introduced at one end of the still and unvaporized residue being continuously withdrawn from the opposite end through chamber G. Vaporization takes place continuously and the vapors are continuously withdrawn and treated by suitable means for accomplishing the desired results.

In the cracking of mineral oils and other hydrocarbons under superatmospheric pressure for the manufacture of gasoline and other light hydrocarbons, the general conditions of operation of the heating system are susbtantially similar to those when distillation takes place under atmospheric pressure. No particular changes are necessary other than the strengthening of the apparatus to withstand the higher pressures imposed, and providing necessary pressure-relief and control valves, suitable fractionating and condensing apparatus, gas separators and the like. Provision may be made for returning reflux distillates to the still for further cracking if desired, and for flashing the heavy residual oil in a suitable flash chamber maintained under reduced pressure.

As when distilling under atmospheric pressure, operations may be conducted continuously, a regulated volume of fresh oil, together with a proportion of refluxed condensate if desired, being continuously fed into one end of the still and uncracked residual oil being withdrawn continuously from the opposite end, vaporization of the products of the cracking reaction taking place continuously, and the vaporized products being continuously withdrawn.

The charging stock should preferably be preheated to as near the cracking temperature as possible before its introduction into the still, the remaining heat requirements for the cracking reaction and vaporization taking place in the still under the closely controlled thermal conditions maintained therein.

The extent of cracking and distillation depends upon the nature of the charging stock and the thermal conditions maintained in the still. Obviously, a wide range of conditions may be established at the will of the operator, by varying temperatures, pressures, and time of contact of the oil with the heating elements.

Owing to the close control of temperatures, and the absence of directly fired heating surfaces in contact with the oil, the accumulation of hard carbon deposits in the still is at a minimum. Such carbon as is liberated normally in the cracking reaction is soft and pulverulent, and remains suspended in the oil stream until discharged from the still with the uncracked residual oil, the suspension of the carbon particles being aided by the agitation afforded by the rotating discs.

It should be particularly noted that while cracking may be accomplished under relatively high velocity in the present invention, the irregular and violent conversion which takes place when oil is injected directly into a highly heated bath of molten metal does not occur under the conditions maintained in the present invention. In the ordinary lead-bath method, the oil must be subjected to a sudden and rapid rise in temperature in order to effect a reasonable degree of conversion within the short time it is in contact with the molten metal. This necessitates a relatively high temperature differential between the molten metal and the injected oil. The oil is converted into vapor almost instantaneously unless a high pressure is maintained in the still, and most of the cracking must be accomplished in the vapor phase while the vapors are seeking escape from the dense mass of metal.

In the present method, the novel system of heat transfer makes it possible to add quickly large quantities of heat to the oil without maintaining high temperature differentials between the oil and the heating medium. When the oil is flowing countercurrent to the flow of the molten pool, the heat additions are so gradually applied that the temperature differential in any zone in the still is not sufficient to cause sudden and violent conversion, or the overheating of any part of the oil or vapors; consequently cracking may proceed uniformly and without destructive reactions. For this reason, there is little deposition of carbon on the surfaces of the discs, and such as might attach itself momentarily, is cleaned off when the surfaces of the discs reenter the oil stream and are again submerged in the molten pool. As long as the oil stream is maintained in sufficient volume to prevent its complete evaporation, no serious coking occurs, and even should the still run dry, the amount of coke formed from the comparatively small volume of oil in the still is not sufficient to interfere with operations after the oil stream is again established.

While in the specification I have specified certain temperatures, I wish it to be clearly understood that I do not wish to limit my invention to a method utilizing any definite temperature or to a method employing any definite means for causing the heating medium and the liquid to be treated to travel in any defined path as my method in treating certain kinds of liquids will operate under certain temperatures to a better advantage than when treating other kinds of liquids, therefore, I reserve the right to make various changes in the apparatus and in carrying out my improved method without departing from the spirit of my invention which consists broadly in subjecting a moving stream of liquid to heat from a mass of liquid and simultaneously filming and using heat absorbed from the mass to accelerate the treatment of the liquid.

What I claim is:

1. The method of heat treating liquids consisting passing a stream of the same through a vessel in contact with the exposed surface of a moving mass of molten metal moving in a reverse direction to the movement of the stream of liquid and simultaneously transferring heat absorbed from within said mass through said stream of liquid as said stream moves through said vessel by alternately immersing and removing therein a plurality of spaced surfaces transversely disposed to the flow of said molten material, simultaneously filming a portion of said liquid as said stream moves through said vessel and applying the additional heat absorbed from said molten mass to said filmed liquid.

2. The method of utilizing molten material in the heat treatment of liquids not miscible with the molten material comprising in continuously moving a stream of liquid to be treated over the exposed surface of a mass of molten material moving in a direction reverse to the movement of the stream of liquid to be treated, transferring heat from within the mass of molten material by alternately immersing and removing therein a plurality of spaced surfaces transversely disposed to the flow of said molten material and passing said surfaces through the stream of liquid to be treated, simultaneously filming the liquid and simultaneously subjecting the filmed liquid to the heat absorbed from said molten material.

3. An apparatus for heat treating liquids comprising a vessel in which molten material is adapted to be maintained at a predetermined level, means for initially heating the same, a heating coil in communication with said molten material within said vessel, means for circulating said molten material through said vessel and coil, a plurality of spaced foraminous discs mounted to revolve transversely within said vessel with portions thereof submerged within said molten material and means for causing liquid to flow over the exposed surface of said molten material and through said discs.

4. An apparatus for heat treating mineral oils and other hydrocarbons comprising a vessel in which molten metal is adapted to be maintained at a predetermined level, a circulatory system in communication with said molten metal, means for heating said molten metal anterior to said vessel, a plurality of foraminated spaced discs mounted to revolve transversely within said vessel with portions thereof submerged in said molten metal, means for causing the liquid to be treated to flow through said vessel on the exposed surface of said molten metal in a direction reverse to the travel of the molten metal, said liquid passing through said discs in its passage through said vessel.

5. The method of heat treating mineral oils and other hydrocarbons comprising in continuously moving a stream of liquid to be treated over the exposed surface of a mass of molten material moving in a direction reverse to the movement of the stream of liquid to be treated, transferring heat from within the mass of molten material by alternately immersing and removing therein a plurality of spaced surfaces transversely disposed to the flow of said molten material and passing said surfaces through the stream of liquid to be treated, simultaneously filming the liquid, simultaneously subjecting the filmed liquid to the heat absorbed from said molten material and simultaneously liberating the vapors.

6. Method of utilizing molten metal in subjecting liquids to the action of heat comprising in passing a stream of the liquid to be treated over a moving body of molten metal reverse to the flow of said molten metal, causing the positive withdrawal of heat in successive steps from the interior of the body of molten metal by alternately immersing and removing therein a plurality of spaced surfaces transversely disposed to the flow of said molten metal, passing said surfaces into and through said stream of liquid, transferring heat directly from said surfaces to the liquid stream, filming a part of the liquid on said surfaces above the liquid stream and subjecting said films to additional heat directly from said surfaces while simultaneously permitting the free escape of vapors from said films.

7. Method of subjecting a flowing stream of liquid to successive additions of heat at progressively higher temperatures while passing through a closed chamber over the surface of a moving body of molten metal comprising in causing the positive withdrawal of heat from within the body of molten metal at spaced points in the direction of its flow by alternately immersing and removing therein a plurality of spaced surfaces transversely disposed to the flow of the molten metal, said surfaces being adapted to absorb heat from the interior of said body of molten metal and transfer it exteriorly thereof, passing said surfaces through the said stream of liquid while causing said liquid to flow in a direction reverse to the flow of the molten metal, transferring heat directly from said surfaces to the liquid stream, filming a part of the liquid on said surfaces above the liquid stream and subjecting said films to additional heat directly from said surfaces while simultaneously permitting the free escape of vapors from said films.

8. An apparatus of the kind described comprising a closed vessel adapted to contain molten metal having an inlet at one end and an outlet at the other end, a conduit in communication with the inlet and outlet, a heating coil in said conduit, a pump in said conduit causing the molten metal to circulate through said vessel and heating coil, means for introducing a liquid into said vessel above said molten metal at one end and withdrawing said liquid at the other end to cause said liquid to flow over the surface of said molten metal in a direction opposite to the direction of flow of molten metal, a plurality of spaced foraminated surfaces movably mounted in said vessel, means for alternately immersing and removing portions of said surfaces into and out of said molten metal to transfer heat from within said molten metal through said liquid into the space above said liquid and to film the liquid on said surfaces, the film of liquid on said surfaces being subjected to the heat absorbed by said surfaces when in said molten metal to aid the vaporization of the liquid and means permitting the free escape of vapors from said vessel.

9. An apparatus of the kind described comprising a closed vessel having means for heating the same, means for circulating molten metal through said vessel in one direction, means for circulating a liquid through said vessel in the opposite direction in contact with said molten metal, means for preheating said liquid, means for heating said metal exterior of said vessel and a plurality of transversely arranged foraminated surfaces movably mounted in said vessel and having portions adapted to be alternately immersed and removed from said molten metal to transfer heat from the molten metal into the stream of liquid and to film said liquid.

10. Method of utilizing molten metal in subjecting liquids and liquid films to the action of heat comprising in maintaining a flowing pool of molten metal in a closed chamber in circuit with a stream of similar molten metal flowing through a heating zone, alternately immersing and removing in said molten pool at spaced points in its course and transverse thereto a plurality of surfaces adapted to absorb heat within the body of said molten metal and transfer it exteriorly thereof, flowing a stream of liquid over the surface of said pool of molten metal in a direction reverse to the flow thereof, passing said surfaces into and through said stream of liquid, transferring heat directly into said stream from said surfaces, filming a part of the liquid on said surfaces and while so filmed adding additional heat thereto directly from said surfaces and simultaneously permitting the free escape of vapors from said films.

11. The method of facilitating heat transfer from a molten material heat carrying medium in the heat treatment of liquids not miscible with the heating medium which comprises maintaining a pool of said immiscible liquid on the horizontal surface of a pool of the molten material maintained at a temperature substantially above the temperature of the immiscible liquid, transmitting a part of the heat requirements of said liquid by direct transfer of heat from the horizontal surface of the molten material to the surface of liquid in direct contact therewith, simultaneously effecting the positive transfer of additional heat to said liquid from within said pool of molten material, without submerging the liquid therein or passing it through the molten material, by alternately immersing and removing in said molten material a plurality of spaced surfaces adapted to absorb heat contained therein and transfer it exteriorly thereof, passing the heated surfaces directly into the superposed pool of liquid and transmitting additional heat thereto directly from said surfaces, thereby accelerating the transfer of heat from the interior of the pool of molten material without passing the liquid therethrough or submerging it beneath the horizontal surface thereof.

12. The method of facilitating heat transfer from a molten material heat carrying medium in the heat treatment of liquids not miscible with the heating medium which comprises passing a continuous stream of said immiscible liquid over the horizontal surface of a pool of the molten material maintained at a temperature substantially above the temperature of the immiscible liquid, transmitting a part of the heat requirements of said liquid by direct transfer of heat from the horizontal surface of the molten material to the surface of liquid in direct contact therewith, simultaneously effecting the positive transfer of additional heat to said liquid from the interior of said pool of molten material, without passing the liquid therethrough or submerging it beneath the surface thereof, by alternately immersing and removing in said molten material a plurality of spaced surfaces adapted to absorb heat contained therein and transfer it exteriorly thereof, passing the heated surfaces directly into the stream of liquid as it moves over the horizontal surface of the molten material and transmitting additional heat thereto directly from said surfaces, thereby accelerating the transfer of heat from the interior of the pool of molten material without passing the stream of liquid therethrough or submerging it beneath the horizontal surface thereof.

13. The method of facilitating heat transfer from a molten material heat carrying medium in the heat treatment of liquids not miscible with the heating medium which comprises passing a continuous stream of said immiscible liquid over the horizontal surface of a pool of the molten material maintained at a temperature substantially above the temperature of the immiscible liquid, transmitting a part of the heat requirements of said liquid by direct transfer of heat from the horizontal surface of the molten material to the surface of liquid in direct contact therewith, simultaneously effecting the positive transfer of additional heat to said liquid from the interior of said pool of molten material, without passing the liquid therethrough or submerging it beneath the horizontal surface thereof, by alternately immersing and removing in said molten material a plurality of spaced surfaces adapted to absorb heat contained therein and transfer it exteriorly thereof, passing the heated surfaces directly into and through the stream of liquid as it moves over the horizontal surface of the molten material, transmitting additional heat thereto directly from said surfaces, continuing the transmission of heat to said liquid by filming a portion thereof on said surfaces above the liquid stream and adding heat to said films directly from said surfaces.

14. The method of facilitating heat transfer from a molten material heat carrying medium in the heat treatment of liquids not miscible with the heating medium which comprises passing a continuous stream of said immiscible liquid over the horizontal surface of a pool of the molten material flowing in a continuous direction through an enclosing chamber and maintained at a temperature substantially above the temperature of the immiscible liquid, transmitting a part of the heat requirements of said liquid by direct transfer of heat from the horizontal surface of the molten material to the surface of liquid in direct contact therewith, simultaneously effecting the positive transfer of additional heat to said liquid from the interior of said pool of molten material, without passing the liquid therethrough or submerging it beneath the horizontal surface thereof, by alternately immersing and removing in said molten material a plurality of spaced surfaces adapted to absorb heat contained therein and transfer it exteriorly thereof, passing the heated surfaces directly into and through the stream of liquid as it moves over the horizontal surface of the molten material, transmitting additional heat thereto directly from said surfaces, continuing the transmission of heat to said liquid by filming a portion thereof on said surfaces above the liquid stream and adding heat to said films directly from said surfaces.

15. The method of facilitating heat transfer from a molten material heat-carrying medium in the heat treatment of liquids not miscible with the heating medium which comprises flowing a continuous pool of the molten material in a continuous direction through an enclosed chamber in circuit with a stream of similar molten material flowing through a heating zone, passing a continuous stream of immiscible liquid over the horizontal surface of said pool of molten material, transmitting a part of the heat requirements of said liquid by direct transfer of heat from the horizontal surface of the pool of molten material to the surface of liquid in direct contact therewith, simultaneously effecting the positive transfer of additional heat to said liquid from the interior of said flowing pool of molten material by interposing in the course thereof a plurality of spaced movable surfaces adapted to absorb heat contained therein and transfer it exteriorly thereof, alternately immersing and removing said movable surfaces in said molten pool, causing said surfaces to absorb heat therefrom, passing the heated surfaces directly into and through said immiscible liquid as it flows over the horizontal surface of the pool of molten material, transmitting additional heat thereto directly from said surfaces, continuing the transmission of heat to said immiscible liquid by filming a portion thereof on said surfaces above the liquid stream and adding heat to said films directly from said surfaces.

16. The method of facilitating heat transfer from a molten material heat carrying medium in the heat treatment of liquids not miscible with the heating medium which comprises maintaining a pool of said immiscible liquid on the horizontal surface of a pool of the molten material flowing in a continuous direction through an enclosing chamber and maintained at a temperature substantially above the temperature of the immiscible liquid, transferring a part of the heat requirements of said liquid by direct transfer of heat from the horizontal surface of the molten material to the surface of liquid in direct contact therewith, simultaneously effecting the positive transfer of additional heat to said liquid from the interior of said flowing pool of molten material, without passing the liquid therethrough or submerging it beneath the surface thereof, by alternately immersing and removing in said molten material a plurality of spaced surfaces adapted to absorb heat contained therein and transfer it exteriorly thereof, passing the heated surfaces directly into the superposed pool of liquid and transmitting additional heat thereto directly from said surfaces, thereby accelerating the transfer of heat from the interior of the pool of molten material without passing the liquid therethrough or submerging it beneath the horizontal surface thereof.

17. An apparatus for heat treating liquids comprising a vessel in which molten material is adapted to be maintained at a predetermined level, a plurality of spaced foraminous discs mounted to revolve transversely within said vessel with portions thereof submerged within said molten material, means for causing liquid to flow over the exposed surface of said molten material and through said discs, a liquid level control chamber, a pipe extending from said vessel and terminating adjacent the bottom of said control chamber, a pipe extending from the free space in said vessel into the upper end of said control chamber for equalizing the pressure in said chamber and vessel and a valve controlled outlet for said control chamber.

WILLIAM O. PRAY.

---

CERTIFICATE OF CORRECTION.

Patent No. 2,100,355.  November 30, 1937.

WILLIAM O. PRAY.

It is hereby certified that error appears in the printed specification of the above numbered patent requiring correction as follows: Page 7, first column, line 24-25, claim 1, for the word "consisting" read comprising; and that the said Letters Patent should be read with this correction therein that the same may conform to the record of the case in the Patent Office.

Signed and sealed this 15th day of March, A. D. 1938.

(Seal)

Henry Van Arsdale
Acting Commissioner of Patents.

tained therein and transfer it exteriorly thereof, passing the heated surfaces directly into and through the stream of liquid as it moves over the horizontal surface of the molten material, transmitting additional heat thereto directly from said surfaces, continuing the transmission of heat to said liquid by filming a portion thereof on said surfaces above the liquid stream and adding heat to said films directly from said surfaces.

15. The method of facilitating heat transfer from a molten material heat-carrying medium in the heat treatment of liquids not miscible with the heating medium which comprises flowing a continuous pool of the molten material in a continuous direction through an enclosed chamber in circuit with a stream of similar molten material flowing through a heating zone, passing a continuous stream of immiscible liquid over the horizontal surface of said pool of molten material, transmitting a part of the heat requirements of said liquid by direct transfer of heat from the horizontal surface of the pool of molten material to the surface of liquid in direct contact therewith, simultaneously effecting the positive transfer of additional heat to said liquid from the interior of said flowing pool of molten material by interposing in the course thereof a plurality of spaced movable surfaces adapted to absorb heat contained therein and transfer it exteriorly thereof, alternately immersing and removing said movable surfaces in said molten pool, causing said surfaces to absorb heat therefrom, passing the heated surfaces directly into and through said immiscible liquid as it flows over the horizontal surface of the pool of molten material, transmitting additional heat thereto directly from said surfaces, continuing the transmission of heat to said immiscible liquid by filming a portion thereof on said surfaces above the liquid stream and adding heat to said films directly from said surfaces.

16. The method of facilitating heat transfer from a molten material heat carrying medium in the heat treatment of liquids not miscible with the heating medium which comprises maintaining a pool of said immiscible liquid on the horizontal surface of a pool of the molten material flowing in a continuous direction through an enclosing chamber and maintained at a temperature substantially above the temperature of the immiscible liquid, transferring a part of the heat requirements of said liquid by direct transfer of heat from the horizontal surface of the molten material to the surface of liquid in direct contact therewith, simultaneously effecting the positive transfer of additional heat to said liquid from the interior of said flowing pool of molten material, without passing the liquid therethrough or submerging it beneath the surface thereof, by alternately immersing and removing in said molten material a plurality of spaced surfaces adapted to absorb heat contained therein and transfer it exteriorly thereof, passing the heated surfaces directly into the superposed pool of liquid and transmitting additional heat thereto directly from said surfaces, thereby accelerating the transfer of heat from the interior of the pool of molten material without passing the liquid therethrough or submerging it beneath the horizontal surface thereof.

17. An apparatus for heat treating liquids comprising a vessel in which molten material is adapted to be maintained at a predetermined level, a plurality of spaced foraminous discs mounted to revolve transversely within said vessel with portions thereof submerged within said molten material, means for causing liquid to flow over the exposed surface of said molten material and through said discs, a liquid level control chamber, a pipe extending from said vessel and terminating adjacent the bottom of said control chamber, a pipe extending from the free space in said vessel into the upper end of said control chamber for equalizing the pressure in said chamber and vessel and a valve controlled outlet for said control chamber.

WILLIAM O. PRAY.

---

CERTIFICATE OF CORRECTION.

Patent No. 2,100,355.     November 30, 1937.

WILLIAM O. PRAY.

It is hereby certified that error appears in the printed specification of the above numbered patent requiring correction as follows: Page 7, first column, line 24-25, claim 1, for the word "consisting" read comprising; and that the said Letters Patent should be read with this correction therein that the same may conform to the record of the case in the Patent Office.

Signed and sealed this 15th day of March, A. D. 1938.

(Seal)     Henry Van Arsdale,
Acting Commissioner of Patents.

CERTIFICATE OF CORRECTION.

Patent No. 2,100,355.                                November 30, 1937.

WILLIAM O. PRAY.

It is hereby certified that error appears in the printed specification of the above numbered patent requiring correction as follows: Page 7, first column, line 24-25, claim 1, for the word "consisting" read comprising; and that the said Letters Patent should be read with this correction therein that the same may conform to the record of the case in the Patent Office.

Signed and sealed this 15th day of March, A. D. 1938.

(Seal)

Henry Van Arsdale
Acting Commissioner of Patents.